US007283886B1

(12) United States Patent  
Bowman

(10) Patent No.: US 7,283,886 B1
(45) Date of Patent: Oct. 16, 2007

(54) PRACTICAL MEASUREMENT SYSTEM FOR A MANUFACTURING PROCESS

(76) Inventor: Richard G. Bowman, 90 Benberry Ct., Kuttawa, KY (US) 42055

(*) Notice: Subject to any disclaimer, the term of this patent is extended or adjusted under 35 U.S.C. 154(b) by 78 days.

(21) Appl. No.: 10/837,216

(22) Filed: May 3, 2004

(51) Int. Cl.
*G06F 19/00* (2006.01)
*G05B 11/01* (2006.01)
*G05B 19/18* (2006.01)
*G05B 15/00* (2006.01)

(52) U.S. Cl. .................. 700/112; 700/13; 700/17; 700/56; 700/65; 700/83

(58) Field of Classification Search ............ 700/13–15, 700/17, 19, 56–66, 83, 89, 95, 112, 114, 159, 700/170, 180, 186, 195
See application file for complete search history.

(56) References Cited

U.S. PATENT DOCUMENTS 3,602,700 A * 8/1971 Jerva et al. ............... 377/17

4,755,950 A * 7/1988 Rao ........................... 700/164

* cited by examiner

*Primary Examiner*—Leo Picard
*Assistant Examiner*—Sean Shechtman

(57) ABSTRACT

A complete Direct Digital Numerical Control (DDNC) automation system for a practical measurement system for a manufacturing process where a given slide or ram is moved under power by input of GO-TO location commands to cause a cascade of motion events to an approximate position, then relax, as a low-cost precision lock system completes the power move into exact absolute final position. This low-cost system uses simple switches & drive systems to operate without computer micro-processor (CNC) or program-logic-controllers (PLC), yet provide accurate final positioning. Position commands are simple real number digits meaningful to the Operator in work-station terms. Add-on Digital Readout Displays (DRO) are optional, as is remote input by other digital programs to augment the simple manual control panel GO-TO commands. This system is engineered for small shops in rural communities; for affordable automation of tiny devices; machines; & even provide numerical control (DDNC) for monster-machines.

6 Claims, 12 Drawing Sheets

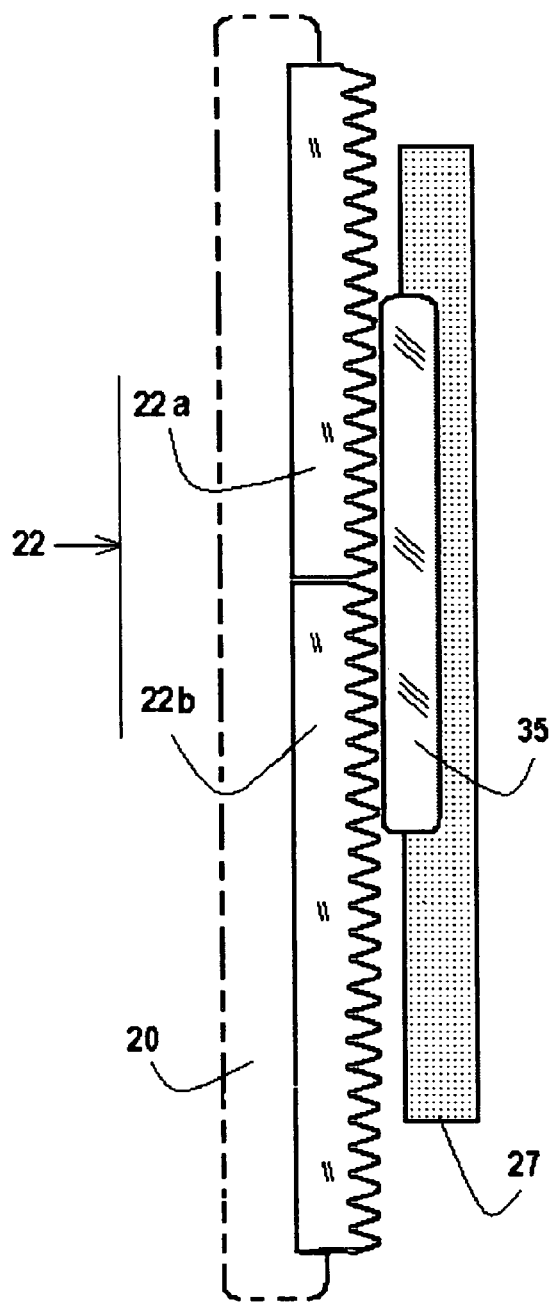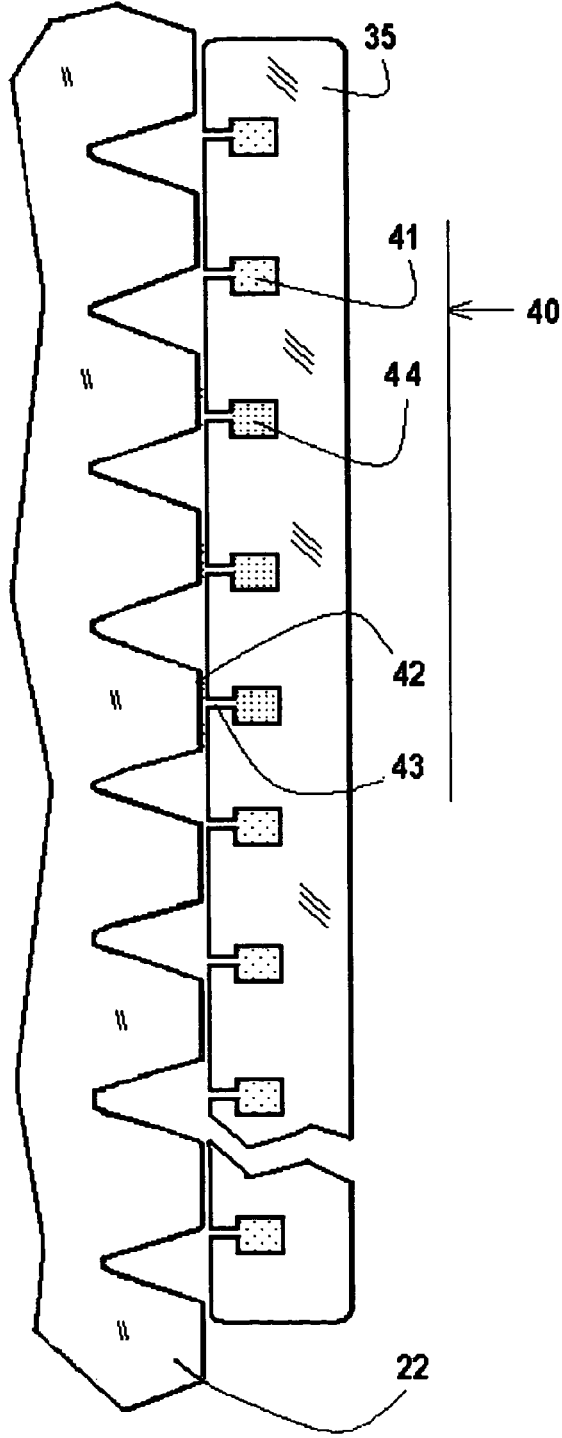
Fig. 7
Fig. 8

PRACTICAL MEASUREMENT SYSTEM FOR A MANUFACTURING PROCESS

FIELD OF THE INVENTION

The present invention relates to direct command and control automation for machines that measure and cut product, machine, sew, paint, weld or measure, and more particularly relates to having an operating work table or carriage that requires push button or program control in real number input.

BACKGROUND OF THE INVENTION

The many existing automation controls are based on using special high-cost-complex machine components. Precision parts are required at each stage, and within each unit, the total-output tolerance is the sum of all the internal errors. Many automation servo units have a complex-signal system to command a movement of a given number of pulses. Each pulse commands an increment-in-motion or change-in-location. These pulses are then converted into a complex-stepper-motor or servo-power-sequence to rotate and cause a linear motion. The pulse-drive requires a precision drive-motor working through a precision gear-box to cause a given twist of a shaft. The shaft has to be mounted in precision bearings, and be made of very precision construction to convert the twist into the required, precise, linear-motion to the travel-ram. Some form of feedback is required in existing automation controls to sense the actual move in relation to the command. All this is hardware is very expensive, and in many systems, special-software is used to avoid major interface problems for electrical commands to provide actual productive work. The whole field of automation and motion control has been changing to encompass special glass-etched scales, rotary and linear encoders, special-stepper and servo-motors as assembled, without any new overall system. A need exists for a redesign, as a means to inject some improved selected complex components into the existing array of numerical control and automation hardware.

Some newer control systems have been developed with laser-beam-transit-time to read "distance" from a given reference point. Special magnetic-encoded scales with complex-markings and other forms of analog-to-digital systems are being used. These more modern controls still only make machines move in accord with input commands. The new sensors have better life and operation in the harsh environment where they are operating. The commands and interface with the physical motion must compare to feedback return signal-readout-information. Computers are needed to handle this type of new extremely complex encryption, and carry that back to the main power control and to a display panel.

High-cost for these systems results from new super-precision-motion-control units. Even a slightly sloppy, gear-tooth-mesh cannot be used in standard CNC systems today. Special zero-back-lash or go-too-far, and-then-back-up special-circuit systems are used, and are required. Many servo-motor packages are very small. This forces the use of long rubbery belts or linkage to extend the motion for a large machine. Most systems decay with age and with wear. Ball screws offer only a tiny, high stress-area-contact to mate the shaft to the nut. Small line pad area is the actual push-surface high-stress interface that is present in all rack and pinion, and all gear-to-gear drive systems. Wear makes for less-accuracy in these prior art system designs using low-contact area interface.

It is therefore an object of the invention to develop apparatus that use simple motion causing drives to power this low-cost exacting and precision-locating and measuring system.

It is another object of the invention to have the apparatus acquire an absolute-location and accurate lock of motion command, to move to "12.3 inches"; or "130.2 MM"; or "12.009 inches"; or "345.01 feet", as examples.

It is another object of the invention to utilize simple electrical-switching-circuits and low-cost, inexpensive, long-life control modules as means to command and control motion.

It is another object of the invention to develop a practical system to operate at, at least 12 volt direct current signal levels for extreme immunity to electrical noise or electromagnetic-interference found around work stations.

It is another object of the invention to acquire proper precise digital numeric command location without the need for microprocessors; any complex computers and logic systems; or expensive subassemblies and components.

It is another object of the invention to provide practical-affordable-automation motion and measurement systems for rural America and third-world-countries to automate their process, increase their productivity, with less need for technicians, and high-cost-expensive servicing equipment.

It is another object of the invention to provide a Digit Readout (DRO) with this option as an add-on motion control subsystem; as well as, for use in its own right, as a measurement display for Operator interface.

It is another object of the invention to replace the much-more-complex motion controls using incremental, binary, or Gray codes as encryption and sensing means for rotary and linear systems.

It is another object of the invention to provide the use of the simple straight forward precision rack with selectable lock segments for extreme accurate end of linear or rotary travel.

It is another object of the invention to eliminate, from a selected group of precision pulse-control drive systems components and subsystems now necessarily embedded in current servo drives for Numerical Control (CNC) machines.

SUMMARY OF THE INVENTION

In accordance with the present invention, there is provided a practical means to construct real low-cost automation operative in real-number-terms, and using directly understandable inches, millimeters, feet or meters. The GO-TO Command is Operator input into a simple control panel with simple switches; that powers a simple motor drive, yet ends the workpiece travel at an exact command location. The whole system of the present invention uses simple motion control parts and subsystems. Direct Digital Numerical Control (DDNC) is offered without the need for micro-processor, computer circuits, expensive, hard-to-make, precision parts, ball lead screws, and precision bearings or rotary or linear encoders.

BRIEF DESCRIPTION OF THE DRAWINGS

A complete understanding of the present invention may be obtained by reference to the accompanying drawings, when considered in conjunction with the subsequent, detailed description, in which:

FIG. 7 is a side view of a section of precision rack 22 being "read" for location by a reader 35 which is secured to the carriage 27.

FIG. 8 is a cross sectional view of a reader 35 unit with set of ten sensor 40 elements showing related locations along rack 22.

DETAILED DESCRIPTION OF THE INVENTION

The practical measurement apparatus of the present invention includes travel control using multi-speed power drive that by command moves at fast, then slow and then creep speeds until near a predetermined final location, where the drive relaxes, and then a precision rack with strong teeth can mesh with the mating carriage lock segments to achieve positive final motion and lock-up. A simple smaller add-on unit can, if used, shift a programmed offset of the lock means to the carriage to further cascade the final move in additional fine increments so as to afford a practical way to develop major numerical resolution of many digits. Thus, travel of 12.4567 inches can be accomplished. This is only four digits for the 12.45 plus another two digits for the 0.0067 shift. This Bowman system can also be configured with a larger slave unit in motion, wherein the smaller measuring unit only resets the final-stop location for the big-carriage. Thus, monster-machines can be controlled to great-accuracy at much lower cost.

It will be apparent to those skilled in the art that further modifications may be made to the embodiments described herein without departing from the spirit and scope of this present invention.

Figure 1:
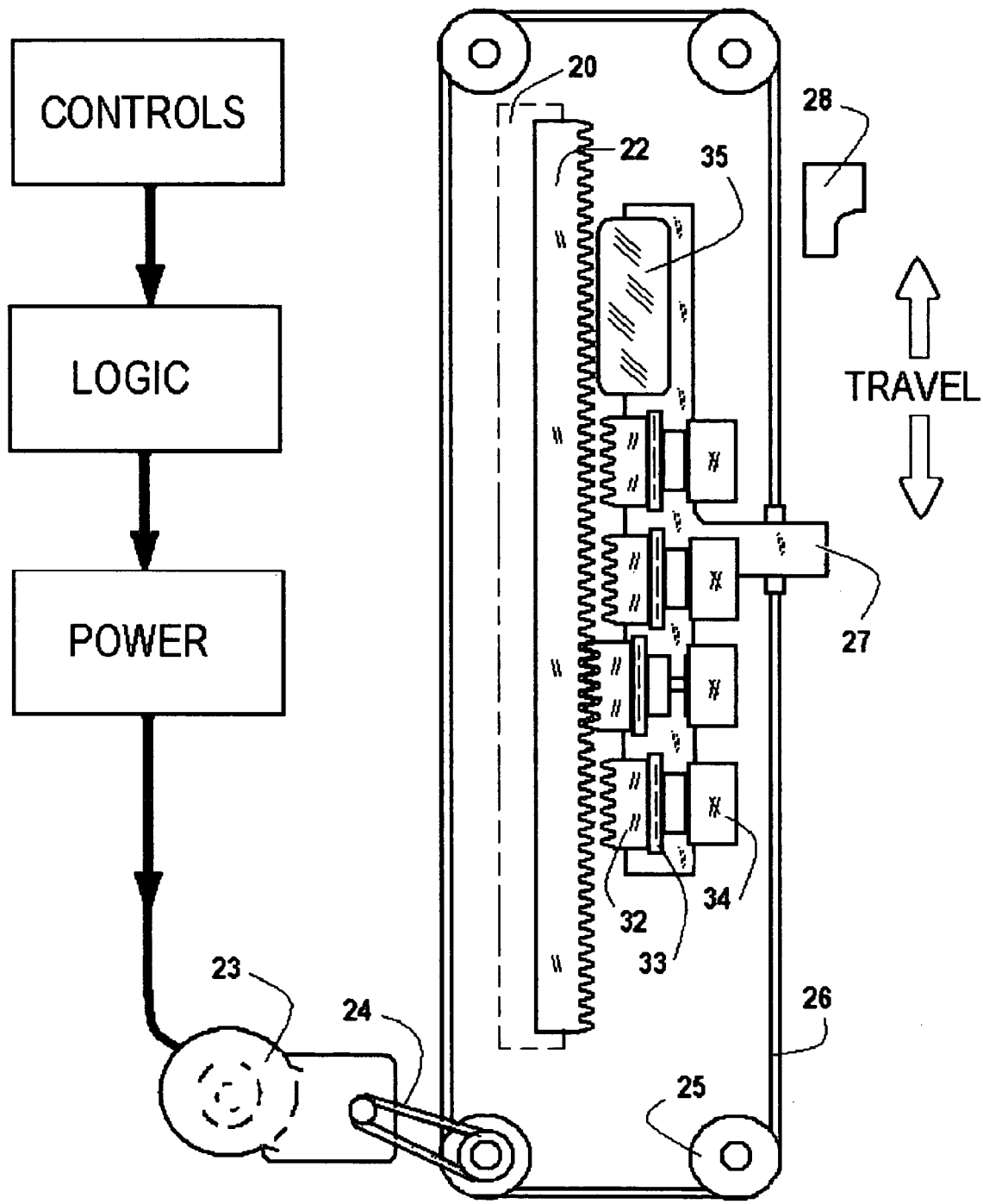
FIG. 1 is a working layout view of the preferred embodiment of a total system for automation of a work table or carriage 27, driven by a simple belt 26, powered by a simple bi-directional and variable speed motor 23 and gearbox drive 24.

In the working layout view of the preferred embodiment of FIG. 1 the, total system for automation of a work table or carriage 27, is driven by a simple belt 26, powered by a simple bi-directional and variable speed motor 23 and gearbox drive 24.

In this embodiment, the start position is against stop 28. The carriage 27 will move fast, then slow, then creep until the drive system locks up with rack 22 being engaged to one of the lock 32 segments as the drive 24 relaxes. The rack 22 mounts to the machine frame 20 as shown in FIG. 1. Actuator 34 will power the tooth-to-tooth mating at the end of travel. This provides the needed energy to move the carriage 27 to the final command go-to location. Motive power for the major point to point move to the approximate end of travel is supplied by a simple belt 26 and pulleys 25 for this very simple design configuration until the selected positive lock 32 can engage with the precision rack 22. Also in this embodiment, Reader 35 is located on the carriage 27. This unit reads the top-of-the-teeth of the precision rack 22 to generate travel-distance-encoding information to operate the logic and feedback digital information system.

Figure 2:
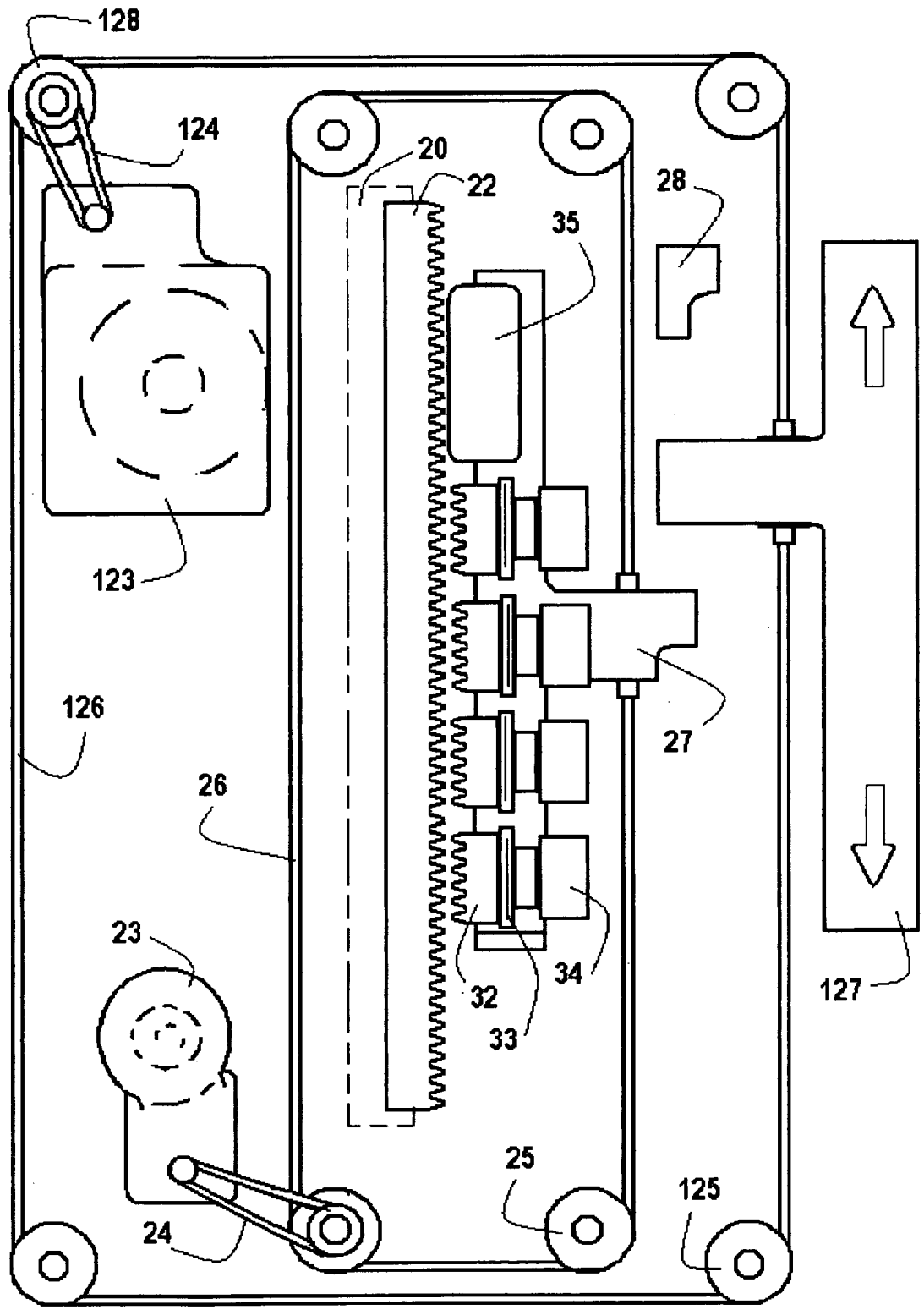
FIG. 2 is a working layout of an additional embodiment for a machine-control utilizing the use of a smaller unit that positions a preset travel stop for the big unit.

FIG. 2 is a working layout of an additional embodiment for a machine-control utilizing the use of a smaller unit that positions a preset travel stop for the big unit. Thus, we have a servo system, as in FIG. 1, that controls a large-machine or process with more work-capacity. In this embodiment, Motor 123 powers a large-capacity gear-box, chain, belt, or other drive means 124 to move the carriage 127. The powered travel for the work table operates between stop 28 and a moveable-preset-stop means on the inner small control carriage 27. In this system, the large work-table 127 will operate as a slave with its own control for proper speed and power with power coupled via the large drive belt 126 and pulleys 125 system or other means, not shown, but that is understood by machine design and motion-control professionals.

Figure 3:
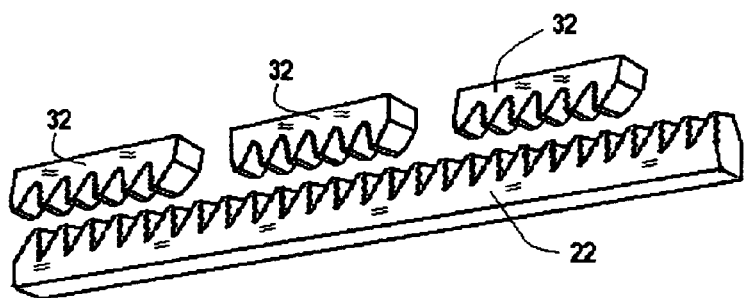
FIG. 3 is a perspective view of an of multiple offset locking segments 32 which mate with a precision rack 22 that works to create an accurate positive final positioning of the system as shown in FIG. 5 and FIG. 6.
Figure 5:
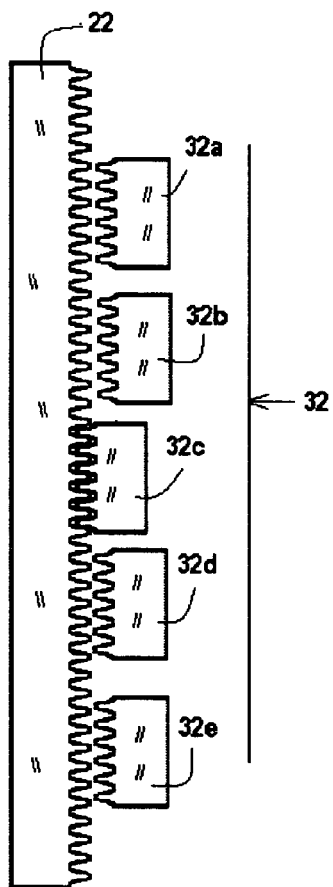
FIG. 5 is a side view of a rack 22 installation of segments 22a and 22b, to provide a means for a long measurement and locking bar with five lock 32 segments.
Figure 6:
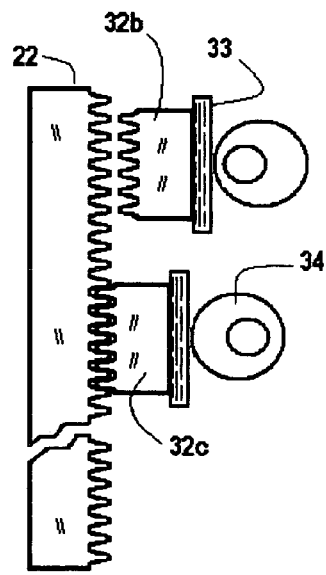
FIG. 6 is a side view of an actuator 34, shown here as a rotary half-turn cam drive, to force a selected lock 32c into a full-lockup-mesh with rack 22.

In the embodiment in FIG. 3, shown in perspective view, multiple offset locking segments 32 which mate with a precision rack 22 that works to create an accurate positive final positioning of the system as shown in FIG. 5 and FIG. 6.

The precision rack 22 can use a 60 degree straight-tooth on precise-pitch-distance so that the same rack 22, a long bar, may be cut into mating lock short locking segments 32, with a practical 85% or better, large contact area.

Figure 4:
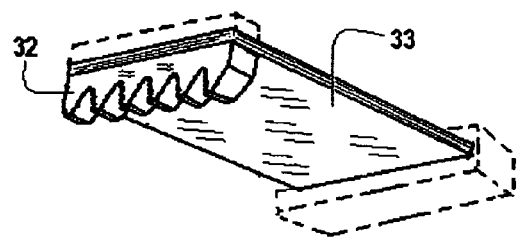
FIG. 4 is a perspective view of a lock 32 segment secured to a lever 33 which hinges the segment lock 33 to clear the rack 22 as shown in FIG. 3, FIG. 5, and FIG. 6.

In the embodiment in FIG. 4, shown in perspective view, lock 32 segment is secured to a lever 33 which hinges the segment lock 33 to clear the rack 22 as shown in FIG. 3, FIG. 5, and FIG. 6. The lever 33 embodiment shown is a simple laminated or spring-type-bendable strip so that positive locking will occur as the rack 22 teeth fully mesh with the lock 32 segment.

In the FIG. 5 side view a rack 22 installation of segments 22a and 22b, provide a means for a long measurement and locking bar with five lock 32 segments. Each of the five locks 32 being offset one to another. If the pitch of the precision rack 22 is 10 MM, then each lock 32a, through lock 32e will locate at exact 2 MM as an end-of-travel location. With the total locking subsystem of the lock 32 segments having an extra odd/even controllable shift of 1 MM (not illustrated here), then the locating-positive-final-travel can be selected in 1 MM increments. 10 MM or 0.400 INCH pitch is a practical rack 22 tooth-to-tooth dimension that corresponds to the need to match Metric or Inch numeric inputs and yet be strong and easy to construct the rack 22 and each lock 32 short segment. The rack 22 can be stationary as locks 32 can travel with the work-table 27 as shown on FIG. 1 and FIG. 2. Other design options for relative-motion are practical too, and this includes other pitch and tooth-angles for this positive lock and mate design selections.

In the FIG. 6 side view an actuator 34, shown here as a rotary half-turn cam drive, will force a selected lock 32c into a full-lockup-mesh with rack 22. Lever 33 hinges the rack segment lock 32c to lock-up the carriage 27 to the machine frame 20. The actuators 34 alternatively could be just multiple simple electric solenoids when the whole system is to be small and large forces are not required.

In the FIG. 7 side view a section of precision rack 22 is being "read" for location by a reader 35 which is secured to the carriage 27. The precision rack 22 can be made, as shown here, in long bars mounted end to end to acquire command stop locations 300 as shown on FIG. 15 and FIG. 16, and as cited as the operational go-to command of the system.

In FIG. 8 shown in a cross sectional view a reader 35 unit with set of ten sensor 40 elements are depicted showing related locations along rack 22. Three of the sensors will be ON, as sensor-yes 44 depiction and seven will be OFF as shown as sensor-no 41. As shown, simple control of air-flow-escaping through orifice 43 activates the ON-OFF of the sensor set 40. Top-of-tooth surface 42 is shown as a shut-off pressure-building valve. Other forms of proximity sensing can be used as well. Special precision spacing and control of the top-of-tooth 42 dimensions are the critical design factors to generate 3-of-10 output signals from the ten sensors of sensor set 40.

Figure 9:
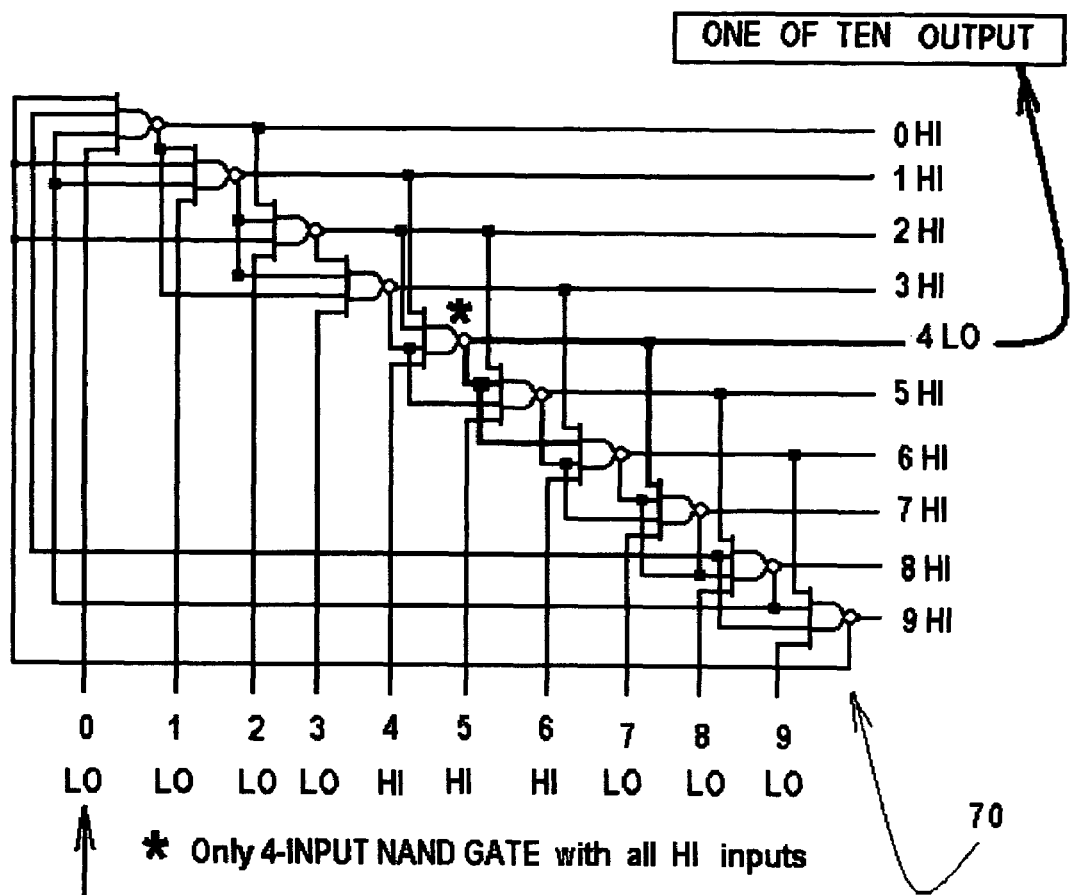
FIG. 9 is a working layout of a view of an electronic circuit.
Figures 9A, 9B:
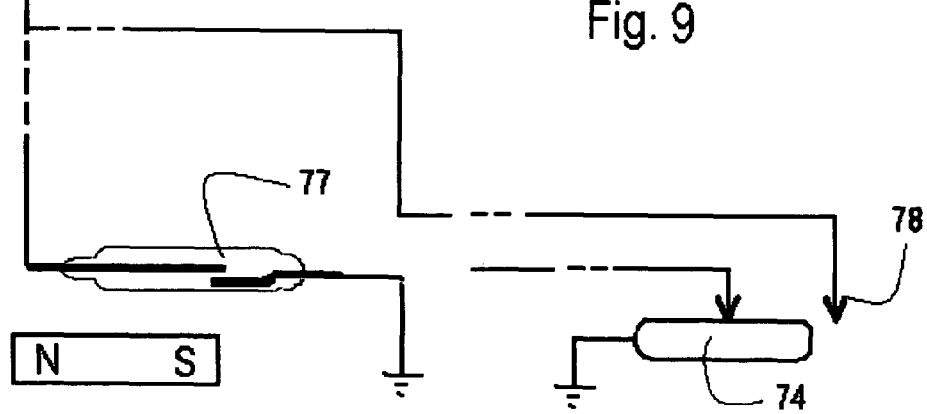

In the working layout view of FIG. 9 an electronic circuit showing ten CMOS NAND gates or other solid-state electronic on-off switches which convert 3-of-10 signal inputs into the lowest numeric single output as 1-of-10. This is a solid-state simple practical circuit means used to substitute for relays or other more-complex switching, or to substitute for more complex forms of computer-electronics for numerical-control of motion-and-measurement. Other computer-logic chips can be used for this same function namely, to accomplish a lock-out-ahead switching, so that the smaller-value-output-number is sent on to the control system. With signals 4+5+6 as inputs, only the 4, being the smallest digit, is sent on to the control system to match and compare with the operational GO-TO Command. The highest digit could also be used with minor design circuit changes; sending the "6" instead of the "4".

Figure 10:
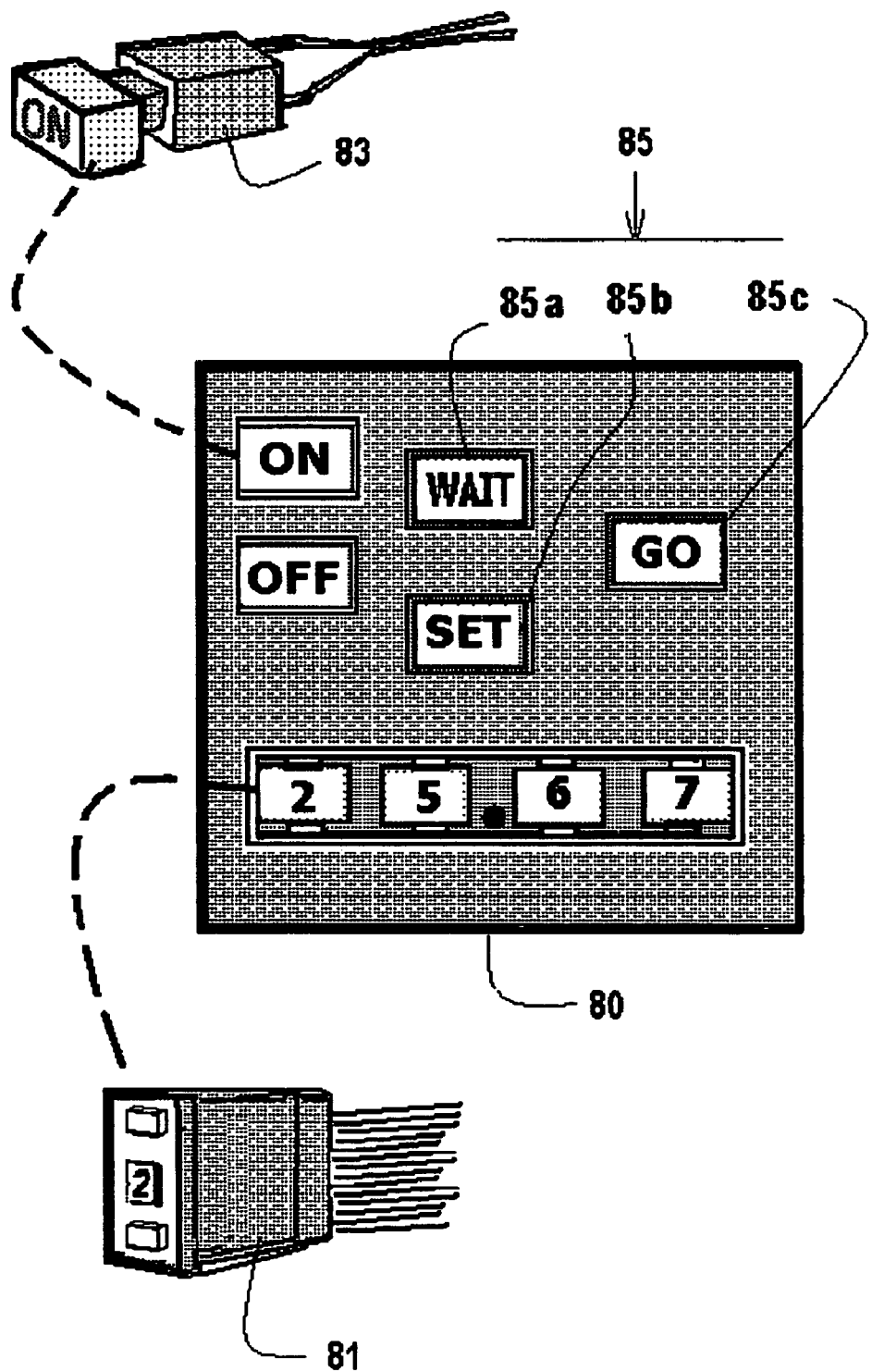
FIG. 10 is a front view of a simple control panel 80 shown here with push-button switches 83 and rotary-decade-switches 81 for electrical command inputs.

As shown in the FIG. 10 front view a simple control panel 80 shown there uses push-button switches 83 and rotary-decade-switches 81 for electrical command inputs to develop go-to commands for this direct-digital-numerical-control (DDNC) that provides the low-cost practical measurement system for a manufacturing process. Switches 85 are shown as devices for command action signaling. Switch 85a placing the control system on-hold so Operator can enter the new command digital information. Then Switch 85b will SET (or "Enter"=computer-term for same action). Then, using Switch 85c, the GO signal will cause the machine system to respond to the new location move command.

Figure 11:
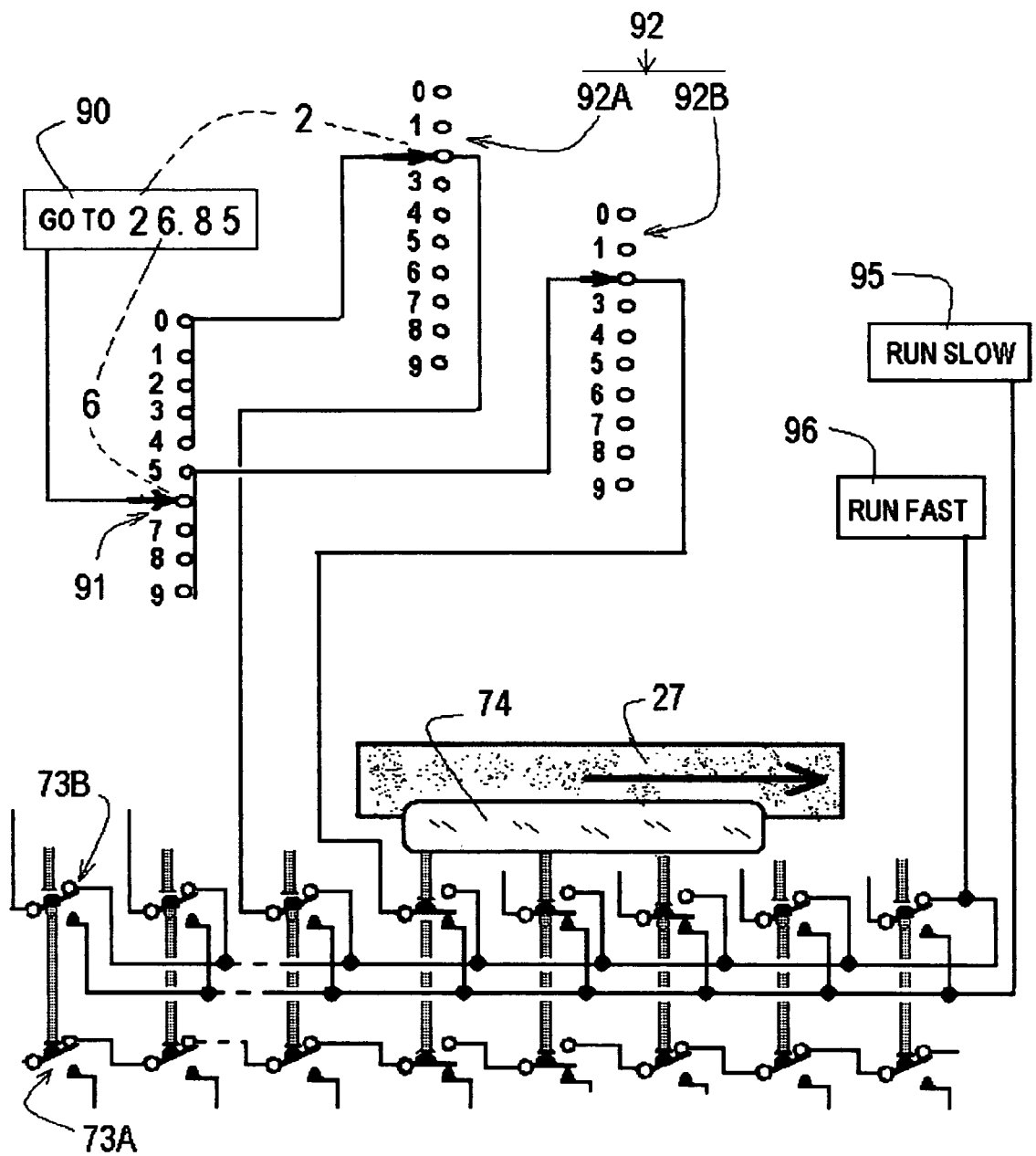
FIG. 11 is a working layout of a view of a wiring diagram for the input go-to command 90 using switch-decade 91 and (first digit) decade-switch 92.

FIG. 11 is a working layout of a view of a wiring diagram for the input go-to command 90 using switch-decade 91 and (first digit) decade-switch 92. These switches route power to and through the many installed limit switch 73 units operated as ON/OFF travel sensing switches by cam 74 mounted on the carriage 27. Power flows through the switch 73 system, then flows to the run fast and run slow 95 and 96 which controls the motor servo drive system. This will power motor 23 to run at high speed past all locations until the carriage 27 nears location "26.5". Then, slow down and run slow. This will continue the bypass all locations until the stop and lock system, shown on FIG. 12, takes over. For the system illustrated, the go-to command: "GO-TO 26.85", cam 74 has an overlap-operation of two of the switches 73B which will change the carriage velocity command from run fast to run slow as location "26.5" is passed. The switch 73B elements, for this example, would be installed at five-inch-centers along the path of travel. Only the active wire circuits, illustrated for the example "26.5", are shown here on FIG. 11 and FIG. 12.

Figure 12:
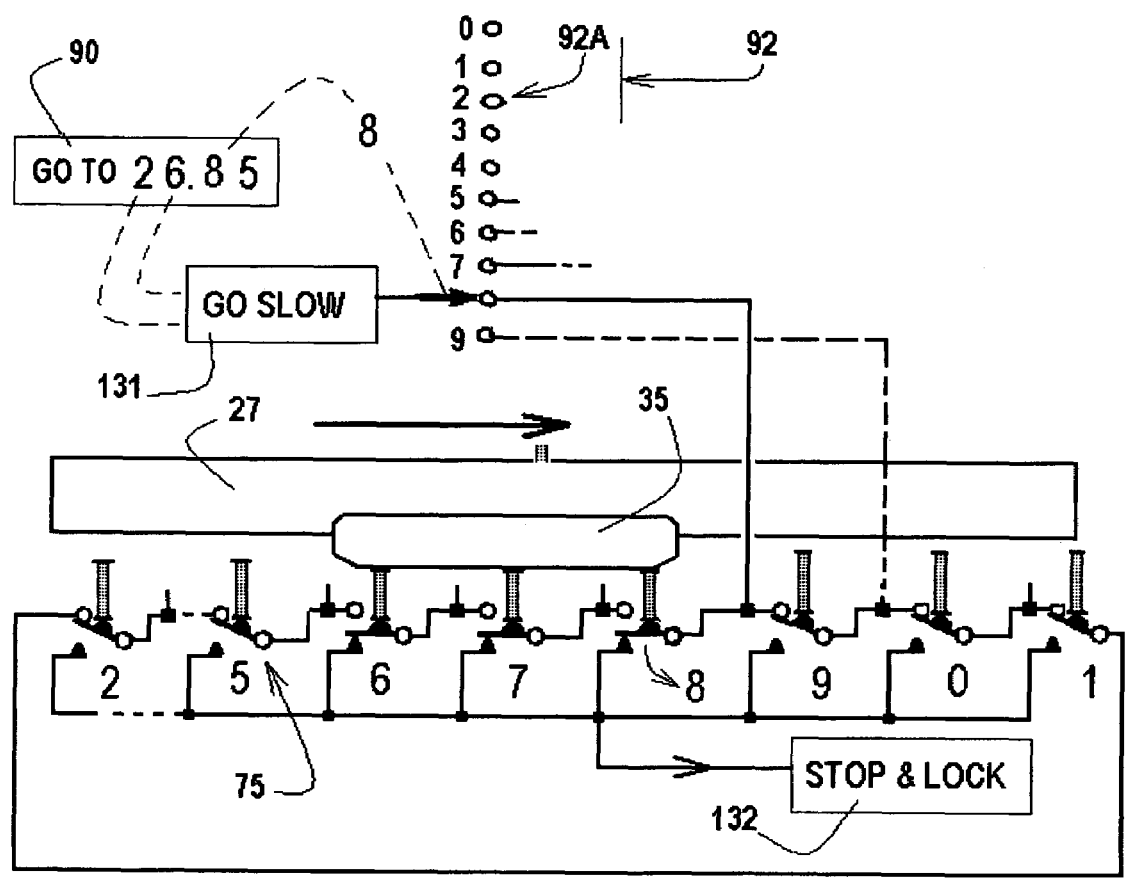
FIG. 12 is a view of a circuit for electrical power from the go slow 131 creep speed command.

FIG. 12 is a view of a circuit for electrical power from the go slow 131 creep speed command (which is powered from the go slow power control as shown in FIG. 11) using decade switch 92A to its corresponding-numeric-selected limit switch 75, and on to the stop and lock 132 power control, which will relax the main drive 23 shown on FIG. 1, which will power the proper actuator 34, as shown on FIG. 1 and in FIG. 6, which will engage lock 32 for final end-of-travel, as in this example, to stop and lock at travel location "26.8" as the go-to command.

Figure 13:
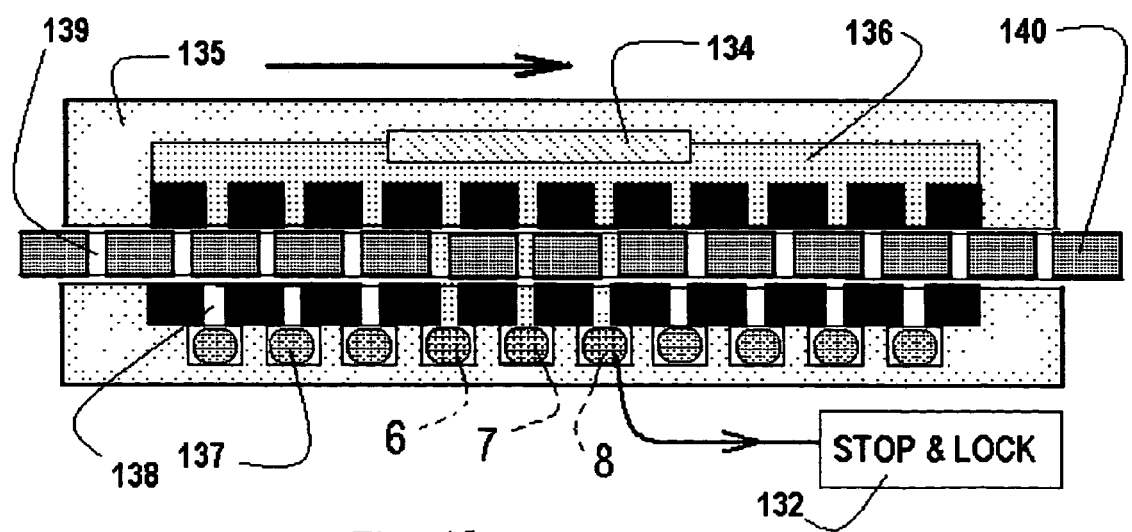
FIG. 13 is a cross sectional view of a view of reader 136 (embedded within reader 135).

FIG. 13 is a cross sectional view of a view of reader 136 (embedded within reader 135) which is a solid-state configuration or embodiment of the limit-switch-matrix-using-limit-switches as shown on FIG. 11 and FIG. 12. This solid-state reader 136 uses simple proximity-location-sensors to read a scale 140 with marks or holes 139. The output circuits will be the same as shown in electrical flow of hard wired switches of FIG. 12 and FIG. 13. Power or energy is supplied from scale reader unit 136 passing thru hole or mark 139 when aligned with passage 138 to trigger sensor 137 to perform switching ON>OFF>ON>OFF operations as the carriage 27 travels. The scale-reader 136 is also precisely constructed to create the same 3-of-10 signal format. Since the actual final location is based on a mechanical positive-lockup of rack 22 to lock 32, all these signals are not really critical, but only make the system run fast; run slow; and creep; and then trigger the mechanical stop and lock events at the end-of-travel.

As a DRO display, after minor modifications to the basic reader 136 greater accuracy is acquired, but the only extreme precise construction is in the fine resolution read-out. When this invention is sized-up to control mega-monsters units, the precision rack 22 may be replaced by other forms of lock-up; larger clamps and pivots or cam rollers for final location. Thus, the solid-state or format of scale 140 in combination with reader-scale 136 format becomes practical as with meters of travel, not only millimeters. Monster-machines also need low-cost, practical-numerical-control for fast, slow, creep motion and yet have accurate stop and lock operations. The marks or hole 139 can be lumps and bumps; paint marks; bar codes; finite engravings; photo-masked etchings to fit even tiny-micro-machines and also for huge mega-monsters.

Figure 14:
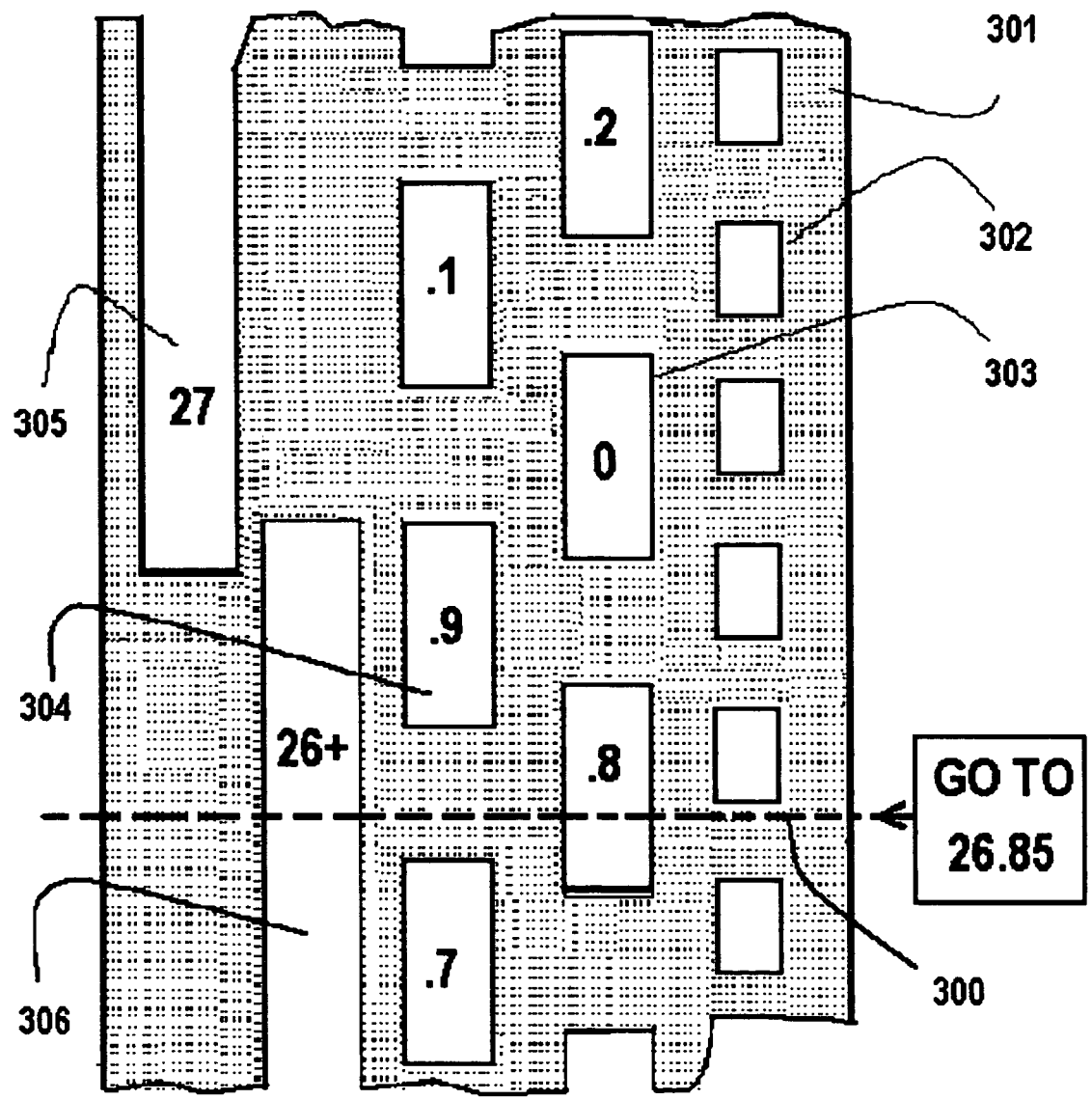
FIG. 14 is a top view of a thin stainless steel foil strip 301.

In the FIG. 14 top view an embodiment of a thin stainless steel foil strip 301 is depicted made with chemically milled holes. The small holes 302 are the means of fine resolution at 10×. A reader, shown on FIG. 16, will generate the required 3-of-10 format that is converted into 1-of 10 signal, as shown on FIG. 9, to correspond to feedback to the control system for the same numeric go-to command of the motion and measuring system of this invention. As shown on FIG. 14 a unique go-to, location 300, for GO-TO "26.85" aligns to intersect "26+" hole 306 and "0.8" hole 303. As shown there, the basic teaching of this embodiment of the invention is the use of over-lapping-signals such as for "26+" Hole 306 and for "27" Hole 305 which will both be ON at and near the transition from "26.99 to 27.00". On the number scale, this is where three of these four digits [x699 & x700] must change-at the-same-time. The correct up-count is: 26.97>26.98>26.99>27.00> then 27.01 So if one digit would lag, the faulty output might be "26.00" or "29.90" or "27.99" during that instant of transition. The complex GRAY code was invented to help solve this by "changing only one digit per space", never changing all-three as in the example. Other formats in other controls systems are used, many requiring real-computing and look-up circuits to develop real-location information. Tremor, wiggle, vibration, and other false real-movement does occur, and many systems send these false-error motion signals that increment-the-total when the tremor is only slight, and no-real-actual motion occurred. The same is true of any electrical-signal-noise, where false-signals are rampant in a numerical-controlled-machine especially around welding-equipment with high-frequency and high electro-magnetic radiation energy levels.

Figure 15:
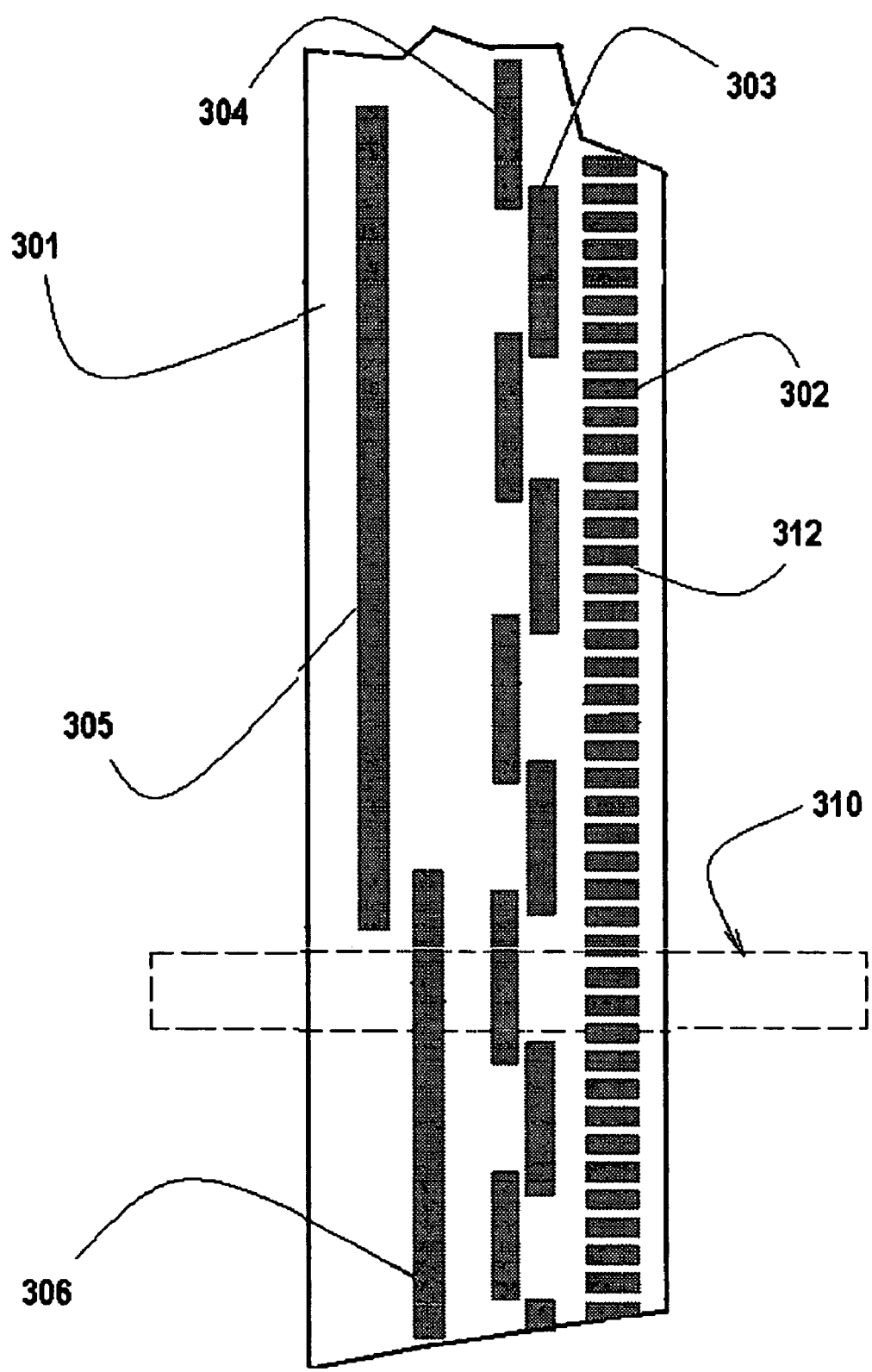
FIG. 15 is a top view of an encoder strip 300

FIG. 15 is a top view of an encoder strip 300 of the present invention or encoder-scale 140 where marks or holes are painted, milled, or etched so that a reader can read these marks. As shown, the marks overlap on the major columns such as marks 303 and 304, and for 305 and 306. This basic Bowman Encoder Code teaches a simple low-cost automation system as a DDNC (direct-digital-numerical-control) system, and an operational DRO (Digital Read Out) when applicable. The fine resolution column Holes or Marks 302 are fixed so they overlap the first half of the center being at 55% coverage. From this, the number count system is generated by a cascade of principles of this invention. The Vernier-principle taught that: "Nine space marks next to ten space marks makes for interpolation at 10× resolution". Taken as a beginning, that principle is further amplified to read the leading-edge-only-of-a-wide line, and then add-a-follow-on-circuit- to change the 3-of-10 signals to 1-of-10 so that the electrical-logic-circuits can perform the read in 10× terms. When this is further followed by good Schmidt Trigger (by another wise man) for solid-state-snap-action electric digital switching, the DNRO (direct-numerical-readout) of the fine scale at TEN UP with the its 3-of-10 sensing circuits having good tolerance and adjustability, with the only critical part of this Bowman scale being to make sure that the leading edge is accurate with the spacing of element 312 which is the start, detail 312, of each fine resolution mark 302.

The broad band overlay "box outline" on FIG. 15, shows the capture of three of the fine resolution marks and the associated overlapping of bigger number-mark columns. The new Bowman control system will bypass of all not-wanted possible stops. Thus, the travel continues to run fast until the right time in the travel path for run slow, then run at creep speed, and then stop and lock.

Further disclosed is the Bowman algorithm that identifies the digital informal in absolute numbers is a finite space or a step function. GO TO: 12.34 is a specific location on a travel of a slide moving to a given target location. This physical location is 23.4% along a path sector starting at 10.00 and ending at 20.00 in real terms. Yet the physical travel movement is an analog or sliding function. This is not a step function. The present invention teaches that travel sectors need to be encoded with two half sections; 10.00 to 14.99, and 15.00 to 19.99 with overlap of approximately 5% each end. Thus, the lower half would extend from 09.95 to 15.05 and the upper half from 4.95 to 20.05 so as to insure that the whole band or travel area is covered by signal generation ability, and that the marks or holes are easy to make, i.e., may allow very sloppy tolerances.

In the DNRO system of the present invention, since the GO TO location is known, the upper digit marks are, made in overlapping pairs, and the proper one of the two can be chosen by the "logic circuits". There is only one "7" between "15 and 20"; one "8" between "26.5 and 26.9" and since we know all the digits, the machine logic can use this to select the proper one of the many "6" locations to slow down along the path until "26+" comes along. This "6" is a positive number and is a location in the upper half of the analog physical travel sector. In the same manner, the slow travel will continue until the "0.8" travel sector is reached. This will trigger the stop and lock which is programmed for 0.1 inch increments. Then, the correct locking segment 32 will engage, the drive relaxes, and the travel will be exactly 26.8 inches along the analog path as a result of a digital command GO TO: "26.8" inch location.

The present "circuit logic" is used with a hard wired system, as shown in FIG. 11, where this powering of the first-half or second-half of the target-location is shown by control switch 91. Here a "6" is shown being the power source for control switch 92B which is the power to the run fast and run slow circuits. A solid-state version shown as decode unit 136 on FIG. 13 has the same task.

One embodiment of the DRO Strip was made with 0.003 inch thick hard "310" stainless steel foil sheet, with the fine resolution holes being chemically milled at 0.006 inch× 0.120 inch wide with pixel by pixel dot mask protective overlay so that a final 0.001 inch accurate encode strip is available at very low cost. This is stainless steel sheet wall-paper precision lace.

It should be further noted that the LOGIC transition in the number count, as this invention teaches, is a control function of the lower digit transition in a fizzy-logic-mode when the 99.999 changes to 100.000. If both the 99.99n and the 100.00n NUMBERS are waiting, then the choice can be by the transition of the least significant or smaller number transition. This avoids all mix up by parallel switching as inherent in the standard Binary Coded disk format. This was overcome, but very complex, by (another wise man's) GRAY Code. The designers of machines have avoided the basic digital 0-9 code, and moved to BCD and other ON/OFF numeric full digital count formats. The DDNC and DNRO systems of the present invention do take more "wires", but are "dumb-simple" with one switch, as one wire=one signal.

Figure 16:
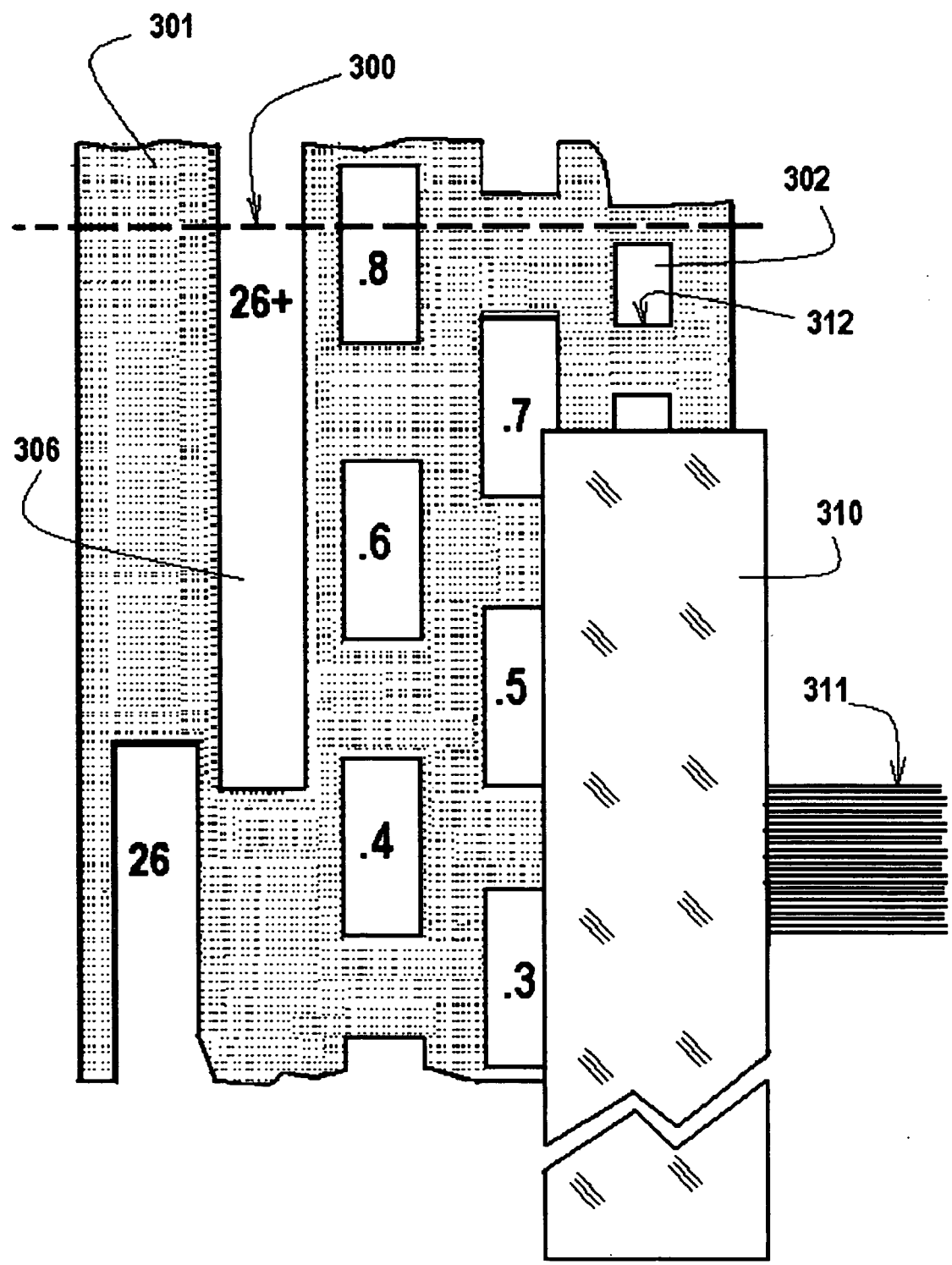
FIG. 16 is a top view of a special encoder-read unit 310 which reads the final column of fine resolution holes 302.

FIG. 16 is a top view of a special encoder-read unit 310 which reads the final column of fine resolution holes 302. The output, as 3-of-10 format, is connected by ribbon wiring 311 to the control system. As shown, the go-to command of 26.85 is a unique-location 300 along the stainless steel foil 301. This reader 310 along with a 1-of-10 circuit card 70, shown on FIG. 9, will develop that last-final-travel location of the fourth-digit as the "5" in the go-to command for "26.85 inches". If the PITCH of the fine-column-spacing of holes 302 is 1 MM, the output signal will be in 0.1 MM. A full resolution for a gain-of-ten or 10× is generated by the reader 310 system.

As practiced with a practical wood-cutting-cut-off-automated-saw, using a precision-rack with pitch-of-0.400 inches, the present invention will allow 0.10 inch resolution that is very-accurate part-to-part. With minor-modification and add-ons, the resolution can be selectable to 0.010 inch or even higher. This is done without the need for micro-processor or programmable-logic-controller (PLC), servo-motors, ground-lead-screws, rotary-encoders, and other extra-fancy control-systems currently normal to very-expensive numerical-control (CNC) systems.

As mentioned before, it is obvious to those skilled in the art that further modifications may be made to the embodiments described herein without departing from the spirit and scope of this present invention.

DESCRIPTION OF THE PREFERRED EMBODIMENT

The following describes the specific embodiments that are preferred.

The preferred embodiment as depicted in FIG. 1 is a working layout view of a total system for automation of a work table or carriage 27, driven by a simple main belt 26, powered by a simple bi-directional servo motor 23 and variable speed gearbox drive 24. The start position is against stop 28. The carriage 27 will move fast, then slow, then creep until the drive system locks-up with rack 22 being engaged to one of the lock 32 segments as the drive 24 system relaxes. The rack 22 mounts to the machine frame 20 as shown in FIG. 1. Actuator 34 will power the tooth to tooth mesh at the end of travel. This will provide the all the final energy to move the carriage 27 to the final command GO-TO location. Power from the drive motor 23 for motion at fast and slow motion is connected by a simple main belt 26 and pulley system 25 for this very simple design configuration. Reader 35 is located on the carriage 27 and reads-the-lop-surface 42 of the precision rack 22 to generate travel-distance-encoding-information to operate the logic and feedback location system.

FIG. 2 is a working layout of a large-machine-control view of a smaller-unit that positions a preset final-locating stop on carriage 27 for end-of-travel for the bigger machine. Thus, we have servo unit system as in FIG. 1 that controls a large slave unit with more work capacity. Motor 123 powers a large capacity gear box, chain, belt, or cylinder 124 to move the big work-table 127. The power motion system operates between stop 28 and a moveable preset means on the Carriage 27. In this system, the large work-table 127 can operate with its own control for proper speed and power for the task with power via the large drive belt 126 and pulley 125 system.

FIG. 3 is a perspective view of an of multiple offset locking segments 32 which mate with a precision rack 22 work accurate positive and accurate final positioning of the system as shown in FIG. 5 and FIG. 6. The precision rack can have a 60 degree straight tooth angle on a precise pitch distance so that the same rack can be used to make the short locking segments 32 with a practical 85% contact 78 area.

FIG. 4 is a perspective view of a lock 32 segment secured to a lever 33 which acts as a leaf and hinges the segment lock 32 clear of the rack 22 as shown in FIG. 3, FIG. 5, and FIG. 6. The lever is shown as a simple laminated or spring-type bendable-strip so that positive-locking will occur as the rack 22 teeth mesh, fully mate, with the teeth of lock segment 32.

FIG. 5 is a side view of a long rack, a metric system measurement and locking bar, with five locking segments lock 32, with each of the five being a 2 MM offset one to another. If the pitch of the precision rack is 10 MM then each lock 32 (32a, thru 32e) will locate at exact 2 MM end-of-travel locations. With the locking system 32 itself having an odd/even shift of 1 MM (not illustrated here), then the locating positive final travel can be selected in 1 MM increments. 10 MM or 0.400 inch pitch is a practical rack for tooth-to-tooth dimensions that corresponds to the need to match Metric or Inch numeric inputs and yet be strong and easy to make this rack 22 bar and all the lock 32 as short piece segments. The rack 22 can be stationary while the locks 32 can travel with the work table 27 as shown on FIG. 1 and FIG. 2.

FIG. 6 is a side view of an actuator 34, shown here as a half-turn cam drive, to force a selected lock 32 (32c) into lockup mesh with rack. Lever 33 hinges the rack segment 32 to mate using locking mesh with stationary rack 22 to apply final end-of travel for carriage 27 as a solid latch-up to the machine bed or frame 20.

FIG. 7 is a side view of a section of precision rack being read-for-location by a reader 35 which is fastened securely to the carriage 27. The precision rack can be made in long bars and sections mounted end to end, or only at various travel location sectors, to acquire desired and accurate travel locations as shown on FIG. 15 and FIG. 16 as detail element 300.

A further embodiment would include a practical measurement system for a manufacturing process for accurate numeric digital control for automating travel of a system for following distance travel commands using real numbers into a simple control switch panel comprising:

a means for mounting the stationary parts and subassemblies on frame 20; and a means for providing power to cause travel of a carriage 27 fast, then slow, then creep, then relax as a selected lock 32 engages with the mating teeth of a precision rack 22. In some design configurations, the motor and drive can just stall urging the carriage 27 tight against a positive stop 28, rigidly mounted to a frame 20, said means for mounting of all stationary parts and subassemblies; and a means for connecting power from a motor 23 or motion means to the travel device or carriage 27, rotationally connected to said means for providing power to cause travel of the carriage 27 fast, then slow, then creep, then relax as the selected lock 32 engages with the mating teeth of the precision rack 22. In some design configurations, the motor and drive can just stall urging the carriage 27 tight against a positive stop 28; and a means for connecting motive power to the traveling carriage 27 from the drive motor 23 and its drive 24 means; and a means for mating tooth to tooth with the precision rack 22, a stationary bar, to provide solid positive lock-up at a selected precise GO-TO command location for a final travel of the motion system; and a means for mounting all the moving parts of the invention and being a work table of the machine, securely fastened to said means for connecting power from the motor 23 or motion means to the travel device or carriage 27, and slidingly mounted to frame 20 as said means for mounting of all stationary parts and subassemblies; and a means for a positive start location, stop 28, as reference for 0000 distance and as for return home command stop location within the system controls; and a means for mounting the lock 32, a rack segment, to the carriage 27 as a simple solid location pivotal means to engage tooth-to-tooth with the stationary precision rack 22, hingedly mounted to said means for mounting all the moving parts of the invention and being the work table of the machine, and securely fastened to said means for mating tooth to tooth with precision rack 22, a stationary bar, to provide solid positive lock-up at a selected precise location of final travel of the motion system; and a means for forcing the selected lock 32 into the stationary precision rack 22 for final motion and lock-up at the final travel go-to command location, rigidly fastened to said means for mounting the lock 32. a rack segment, to the carriage 27 as a simple solid location pivotal means to engage tooth-to-tooth with the stationary precision rack 22, and rigidly mounted to said means for mounting the stationary parts and subassemblies; and a means for sensing the travel location as the carriage 27 moves by sending 3-of-10 signals to the control system for operation of the final precision lock-up at the end of go-to-command travel, rigidly mounted to said means for mounting all the moving parts of the invention and being the work table of the machine; and a means for creating a positive 3-of-10 signal output relative to the approximate travel position of the moving carriage 27 for control of the final go-to-command location, completely internal to said means for sensing the travel location as the carriage 27 moves by sending 3-to-10 signals to the control system for operation of the final precision lock-up at the end of go-to-command; and a means for sensing the open-area before or after the top of the tooth of the rack 22 has moved, permanently fitted to said means for creating a positive 3-of-10 signal output relative to the approximate travel position of the moving carriage 27 for control of the final go-to-command location; and a means for sensing the location-of-travel in relation to the top-of-the-rack 22 tooth, element 42, to generate one of the 3-of-10-signal outputs, sensors 40, permanently internal to said means, reader 35, for creating a positive 3-of-10 output relative to the approximate travel position of the moving carriage 27 for control of the final go-to-command location; and a means for connection or interface means for sensor 40 to the top surface 42 of the tooth of rack 22; and a means for generating a simple accurate proximity sensor reader 40, for the low-cost version of this invention for motion and use as a measuring system by substitution for the encoder 310 where DRO (digital read out) is not needed; and a means for converting 3-of-10 signals into 1-of-10 format to interface, element 70, with the go-to-command digital control system; and a means for reading-the-location-change or travel of the carriage 27 by a cam 74 so as to properly direct power to the run fast 96 and run slow 95 power control subsystems; and a means for making limit switches corresponding to given areas of travel of the carriage 27, operationally linked to said means for reading-the-location-change or travel of the carriage 27 by a cam so as to properly direct power to the run fast 96 and run slow 95 power control subsystems; and a means for sense the time to stop forward-travel, relax-the-drive means system units 23 and 24 and power the actuator 34, and engage positive go-to-command location as lock 32 mates with precision rack 22 operationally coupled to said means for operating limit switches corresponding to given areas of travel of the carriage 27; and a means for providing close proximity of location by sensing change-in-the-magnetic-field as a magnet assembly by a reed switch set by action of the travel location of carriage 27; and a means for sense travel of the carriage 27 with a varied choice of simple contact and operational proximity switches located along the path of carriage 27 travel; and a means for supplying direct dial-in-digital-numeric-command information to the motion and measurement system in real-terms remote electrical format source or by simple operator push buttons and rotary switches; and a means for supplying power to generate run fast, then run slow, then creep speed to the system servo drive; and a means for powering the correct selected limit switch 73B to bypass all stop locations, until the drive slows down and system relaxes, and a solid lock-up occurs; and a means for changing the velocity of the carriage 27 to ramp down from fast to slow and then creep speed which is operationally coupled to said means for reading-the-location or change of travel of the carriage 27 by a cam 74; and a means for controlling the servo motor 23 for fast operation, ramping up to speed, traveling along at a proper rate, and then reacting to the slow and then creep commands from the run slow 95 control unit, operationally coupled to said means for changing the velocity of the carriage operationally coupled to said means for reading-the-location change or travel of the carriage 27 by Cam 74; and a means for powering the stop and lock actuator 132 after the carriage 27 travels to a near location as sensed by the sensing travel circuits of the cam operated limit switches or a solid-state location sensing reader unit; and a means for powering the lock 32 into the precision rack 22 at the end of the travel of the go-to-command 90, electrically coupled to said means for sense the time-to-stop forward-travel, relax the drive means system units 23 and 24 and power the actuator 34, and engage positive lock-up with precision rack 22 and operationally coupled to said means for reading the location change and travel of the carriage 27 by a cam: and a means for supply the ten proximity sensors, with power, such that when the hole 139 in scale 140 aligns, energy flow thru path 138 to trigger the proximity sensor 137; and.

a means for supplying 3-of-10 location signals for the carriage 27 travel by reading scale 140 which will generate a stop and lock 132 signal, operationally linked to said means for controlling the servo motor 23 for its fast, slow and creep speeds, operationally connected to said means for final end of travel lock-up of the system at the go-to command location; and a means for connecting power to the Sensors 137 from energy device 136; and a means for generating one of the 3-of-10 signals so as to cause the final end-of-travel with a power output to generate the Stop and Lock 132 signal; and a means for supply energy, element 136, as needed, to operate the Sensor 137 when aligned with the holes 139 in the scale 140; and a means for provide a signal path 138 for reading the carriage 27 travel location to sensors 137; and a means for controlling the signals in this motion and measuring system with a solid-state device, in lieu of cams and mechanical switches, operationally connected to said means for supplying 3-of-10 location signals for the carriage 27 travel by "reading" scale 140: and a means for providing a suitable simple control panel to input the GO-TO Command 90, dynamically controlling said means for controlling the motor 23 for fast operation, ramping up to speed, traveling along at a proper rate, and then reacting to the slow and then creep commands from a run slow 95 control unit;

a means for directing commands for: SET, WAIT, GO, ON, OFF . . . and sequential commands for system operation, conveniently fitted to said means for providing a suitable simple control panel to input the go-to-command 90; and a means for input of the go-to command 90 . . . such as GO TO "26.85" conveniently fastened to said means for providing a suitable simple control panel to input the go-to-command 90; and a means for moving a large carriage 127 between stop 28 and a moveable stop on carriage 27 so a bigger work table capacity can operate between one or two inner systems so there is a preset able "left", and if add-on option, a second presetable "right" stop on another complete Carriage 27 system being controlled by a suitable simple control panel to input the go-to-command 90; and a means for moving under power the large carriage 127 or work table by use of belt 126, pulley system 125, and coupler 128 as a main drive that could be a cylinder, a chain instead of belt, a rack and pinion drive: and a means for a virtual location 300, corresponding to the numeric go-to-command 90, directly coupled to and developing said means for interfacing with a suitable simple direct-digital-input to the control panel and the control logic system for this go-to-command 90; and a means for generating travel location information from the carriage 27 motion and position as an absolute-numeric-number value directly-encoded-and-decoded as real inches or millimeters permanently mounted to said means for mounting of all stationary parts and subassemblies; and a means for generating the fine resolution of the system or the fourth digit of a four digit go-to command, and or adding as option for "123.456" inches . . . a six digit program and design configuration; and a means for encoding the location travel area or sector of a given even third digit command; and a means for encoding the location travel area of a given odd third digit command; and a means for bypassing all early travel until the carriage 27 enters the last sector or zone of travel when the system goes to run slow motion speed; and a means for changing the speed of the travel to run slow as the carriage travel is read as being within the last section of travel zone; and a means for producing 3-of-10 final positioning signals by reading the encoder strip 301 holes 302 in the fine resolution column dynamically coupled to said means for generating travel location information from the carriage 27 as for motion and position as an absolute-numeric number-value directly-encoded-and-decoded into real inches or millimeters operationally controlling to said means for controlling the servo motor 23 for fast operation, ramping up to speed, traveling along at a proper rate, and then reacting to the slow and then creep commands from the run slow 95 control unit and permanently mounted to said means for mounting all the moving parts of the invention and being the work table of the machine.

The foregoing embodiments of a practical measurement system for a manufacturing process may further comprise means for providing power comprising a simple bi-directional multi-speed servo drive power unit servo motor to cause travel of the carriage 27 fast, then slow, then creep, then relax as the selected lock 32 engages with the mating teeth of the precision rack 22 with in some design configurations, the motor and drive can just stall urging the carriage 27 tight against a positive stop 28.

The foregoing embodiments of a practical measurement system for a manufacturing process may further comprise means for mating tooth-to-tooth with precision rack 22, a stationary bar, to provide solid positive lock-up at a selected precise location of final travel of the motion system comprises a short precision rack lock 32 segment with multiple teeth, each with approximately 85% broad area contact with a the same full mating of teeth on the long precision rack 22.

The foregoing embodiments of a practical measurement system for a manufacturing process may further comprise means for mounting the lock 32. a rack segment, to the carriage 27 as a simple solid location pivotal means to engage tooth-to-tooth with the stationary precision rack 22 comprises a simple spring-arm lever 33 for a selected lock 32 segment, constructed from spring-steel or composite-laminate or other bendable material, as also can be alternative non-simple subassembly with rigid materials and pivot bearings, shafts and a strong fabricated lever when large forces are required.

The foregoing embodiments of a practical measurement system for a manufacturing process may further comprise means for forcing the selected lock 32 into the stationary precision rack 22 for final motion and lock-up at the final travel go-to-command location comprises a simple power device for lock 32 means, being solenoid, cylinder, rotary cam, link, leaf or wedge actuator.

The foregoing embodiments of a practical measurement system for a manufacturing process may further comprise means for creating a positive 3-of-10 signal output relative to the approximate travel position of the moving carriage 27 for control of the final go-to-command location comprises a set of ten top-of-tooth sensors 40 that signal proximity of the tooth-surface, senses the tooth surface by magnetic, electrical, optical, or valve action with low flow air stream using a modified Vernier offset pitch location to produce signals of the approximate location to the control system for speed control, and is not critical for the final location.

The foregoing embodiments of a practical measurement system for a manufacturing process may further comprise means for generating control signals comprises a simple accurate proximity sensor for the low-cost version of this invention for motion using a measuring system taking signals from the precision rack teeth, instead of a separate encoder unit where a DRO (digital read out) is not needed, comprises a precision ground top surface 42 on the teeth of rack 22; read by reader 35 on carriage 27.

The foregoing embodiments of a practical measurement system for a manufacturing process may further comprise means for converting 3-of-10 signals into 1-of-10 signal format to interface with the go-to-command digital control system comprises a complete NAND CMOS or similarly functioning devices as a circuit card using a special solid state circuit for digital format conversion.

The foregoing embodiments of a practical measurement system for a manufacturing process may further comprise means for reading the location change or travel of the carriage 27 by a cam 74 comprising sets of simple double-pole double-throw (DPDT) limit switches or a solid-state unit with the same switching functionality.

The foregoing embodiments of a practical measurement system for a manufacturing process may further comprise means for sensing the time to stop forward travel, relax the drive means system units 23 and 24 and power the actuator 34, and engage positive go-to-command location as lock 32 mates with precision rack 22, comprises a simple SPDT limit switch 75 set or solid-state switching signal unit operated by cam 74.

The foregoing embodiments of a practical measurement system for a manufacturing process may further comprise means for providing close proximity of location by sensing change in the magnetic field as a magnetic-field cam passes by a comprises a simple magnet system and simple reed (limit) switch set or other magnetically triggered switching elements.

The foregoing embodiments of a practical measurement system for a manufacturing process may further comprise means for sense travel of a carriage 27 comprises a simple electric contact (as a limit switch) set which make electrical contact with a set of companion parts, contact 74 and including use of brush-type multiple hard alloy contacts and switch contact pads serving the function.

The foregoing embodiments of a practical measurement system for a manufacturing process may further comprise means for supplying power to generate motor speed control comprises a simple rotary digital 1 of 10 switch, or a special solid-state package with latch-up outputs for an electronic version of same switching input functions operating from a remote command source.

The foregoing embodiments of a practical measurement system for a manufacturing process may further comprise means for powering the correct selected locating sensing limit switch comprises a dual 1 of 10 rotary Switch 92A and 92B, or equivalent functional solid-state circuit, to directly power control circuits for fast and slow operational commands to motor drive system.

The foregoing embodiments of a practical measurement system for a manufacturing process may further comprise means for controlling the signals in this motion and measuring system with a solid-state device, in lieu of cams and mechanical switches, comprises an encoder scale with holes or marks as means to generate the same functional travel-location-signal information.

The foregoing embodiments of a practical measurement system for a manufacturing process may further comprise means for generating travel location information from the carriage 27 motion and position as an absolute-number-value directly-encoded- and -decoded with real-inches or millimeters comprises a thin stainless steel or metal foil with chemically milled or etched as holes in a simple encoder strip 301, or etched or painted marks or holes on a solid scale 140.

The foregoing embodiments of a practical measurement system for a manufacturing process may further comprise means for encoding the location travel area of a given even and an odd, or half-distance, for a third-digit or intermediate command mark comprises an overlapping-dual-encoding of such travel segment or travel-area sectors.

The foregoing embodiments of a practical measurement system for a manufacturing process may further comprise means for bypassing all early travel stops until the carriage 27 enters the last zone of travel when the system goes to run slow comprises a long mark covering the appropriate first half or second half of a given travel sector areas as selected by the a motion control algorithm from the control panel input data that coverts this digital data into analog motion commands.

The foregoing embodiments of a practical measurement system for a manufacturing process may further comprise means for changing the high speed of the travel to run slow as the carriage travel is read as being within the last five-inch of travel zone comprises a long 5.5 inch mark or hole or switch operation that covers the appropriate travel area, then this hole or mark triggers the slow speed until the last half-inch, then creep speed until the last-digit is read, and the system engages the positive-lock and the drive relaxes at the final go-to-command location.

The foregoing embodiments of a practical measurement system for a manufacturing process may further comprise means for producing 3-of-10 final positioning signals by reading the encoder strip 301 and holes 302 in the fine resolution column comprises a special electronic package to decode this fine resolution position information to create 3-of-10 location signals within encoder reader 310 unit to signal the stop and lock system using electrical signals via ribbon wiring 311 to the motion control system so the appropriate selectable lock segment 32 will mate with precision rack 22 for final travel location.

One further embodiment of a practical measurement system for accurate numeric digital control for automating travel of a system for following distance travel commands using real numbers into a simple control switch panel is a system comprising:

a frame, for mounting of all stationary parts and subassemblies; and a simple bi-directional multi-speed servo drive power unit servo motor to cause travel of a carriage fast, then slow, then creep, then relax as an appropriate selected lock engages with the mating teeth of the precision rack and within some design configurations, the motor and drive can just stall urging the carriage tight against a positive stop; and a simple belt, chain, gear box, or cylinder, non positive simple servo drive belt, chain or other simple device to impart motion to a moving carriage or work table; and a simple belt, chain, or other simple device to impart motion from a servo drive; and a short precision rack lock segment with 85% contact area with precision rack; and.

a carriage or work table which is moved by the system in accord with go-to-commands; and a simple preset physical stop which is the start of reference 0000 distance; and a simple spring-arm lever for a selected lock segment, constructed from spring-steel or composite-laminate or other bendable material, as also can be alternative non-simple subassembly with rigid materials and pivot bearings, shafts and lever; and a simple power device for a lock means, being solenoid, cylinder, rotary cam, link, leaf or wedge actuator; and a special sensor subassembly reader unit for the top-of-the teeth on a precision rack; and a set of ten top-of-tooth sensors that signal by proximity tooth-surfaces, sensing each tooth surface by magnetic, electrical, optical, or valve action with low flow air stream using a modified Vernier offset pitch location to signal approximate location to the control system for speed control and is not critical for the final travel location; and a set of simple proximity sensing devices activated by the top-of-the-tooth to provide digital OFF final signal outputs to the control system; and a set of sensor switches using possible air pressure to activate this readout location device with top of tooth being an air flow escape control valve; and an orifice for air flow, or variable magnetic or optical sensing signaling means; and a simple accurate proximity sensor for the low-cost version of this invention for motion and use as a measuring system as a substitute for the encoder system where DRO (digital read out) is not needed comprises a precision ground top surface on the teeth of rack read by reader on a moving carriage; and a complete NAND CMOS or similarly functioning devices as a functional circuit assembly using a special solid-state circuit for digital format 3-of-10 to 1-of-10 conversion; and sets of simple double-pole double-throw cam operated (DPDT) limit switches; and a simple cam unit to operate a plurality of travel area defining limit switches; and a simple SPDT limit switch set operated by cam on a moving carriage; and a simple magnet system and simple reed (limit) switch set to sense carriage motion; and a simple electric contact (as a limit switch) set which make electrical contact with a set of companion parts as a means to sense carriage or work table relative motion; and a dial-in rotary switches to command on the control panel as real numbers or an additional remote lookup or automatic down-load of data for this same go-to-command information; and a simple set of rotary digital 1 of 10 switches, or a special solid-state package with latch-up outputs for an electronic version of required travel command switching input functions; and a dual set of 1 of 10 rotary switches or equivalent functional solid-state circuit to directly power control circuits for fast and slow operational commands to motor drive system; and a simple bi-directional variable speed control for power to the carriage drive; and a simple variable speed bi-directional power unit to power drive servo motors; and a creep command system where main servo motor is powered for slow and then relax; and a special control circuit for powering a stop and lock control subsystem for a lock segment and actuator operation to mate with a section of a precision rack for final travel location; and an energy device to power the sensor system within a precision rack reader unit; and.

a set of ten signal sending sensors to generate travel position from teeth on a rack; and a power source for air, light, or other means for rack location sensing devices; and.

a set of solid-state of ON-OFF devices embedded within a rack reader; and a simple variable energy flow path means to operate ON-OFF sensor devices; and a simple sets of holes or marks on a scale or strip to develop location information; and an encoder scale with holes or marks in multiple rows for plurality of digit readout as means to generate a fill numeric set of DRO travel-location-signal information; and.

a simple Operator input motion control using simple switch circuits and wiring; and a set of push-button or contact-selector-switches for direct travel commands; and a set of simple rotary ten-position-decade switches with marker legends to indicate the go-to-command location; and a simple bi-direction high energy variable speed power a large slave drive system; and a simple power belt, chain, link or drive for a large slaved work table or carriage; and a target location for the motion and measurement and for construction of machine as to a logical reference to a digital travel command within the analog motion logic control system; and a thin stainless steel or metal foil with chemically milled or etched as holes in a simple encoder strip or marks on a solid scale indicating absolute travel locations; and a direct absolute number encoding via columns of etch lines, marks or holes in or on a scale or strip and special circuits to interpret or decode the analog position into digital location; and a long hole or mark with overlap to cover approximately 60% of the half-distance of the digit column to read even/odd or first-half/second-half travel sectors for match/compare with numbers in the third or for a intermediate locating digit of the go-to-command; and an overlapping-dual-encoding of such travel segment or travel-area sectors; and a long mark covering the appropriate first half or second half of a given travel sector areas as selected by the a motion control algorithm; and a long 5.5 inch mark or hole or switch operation that covers the appropriate travel area, then this hole or mark triggers the slow speed until the last half-inch, then creep speed until the last-digit is read, and the system engages the positive-lock and the drive relaxes at the final go-to-command location; and a special electronic package unit to decode this fine resolution to create 3-of-10 location signals within encoder reader 310 unit to signal the stop and lock system using electrical signals via simple ribbon wiring to the control system.

A further embodiment of a practical measurement system for a manufacturing process may further comprise a numeric digital display of the analog relative motion, provided by any means, that is processed from overlapping direct electrical signals, or solid-state electronic multi-digital signals of travel-feedback-signals via the direct conversion of 3-of-10 to 1-of-10 travel sector information developed by a reader to generate absolute-position-information from precision teeth on a rack or from a simple slide or encoder from holes or marks thereon, or from a multi-digital slide or strip-encoder from holes or marks thereon.

A further embodiment of a practical measurement system for a manufacturing process may further comprise a system where digital display of analog motion via absolute-position-information from overlapping switching-signals of travel-feedback-signals via direct conversion of 3-of-10 to 1-of-10 travel information from precision teeth on a rack and/or from a multi-digital slide or strip-encoder from holes or marks thereon and this information is further used to control a machine or process as digital feedback information to, or within, a manual, NC, CNC or PLC device or system or process including military, industrial, commercial, automotive, instrumentation, motion and controls for absolute position signal information.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of the inventions described and depicted herein.

What is claimed is:

1. A practical measurement system for a manufacturing process for accurate numeric digital control for automating travel for following distance travel commands using real numbers input to a control panel, the system comprising, means for mounting stationary parts on a frame, a carriage and a means for providing motorized, bi-directional, multi-speed, power to cause travel of said carriage against a positive stop mounted to said frame, and to cause travel fast, then slow, then creep, then relax as a selected lock rack segment having teeth engages with teeth on a precision rack for mating therewith, and means to transfer motive power to said carriage from a drive motor having a drive means, means for mating tooth to tooth with said precision rack, that includes an actuator, a stationary bar, to provide solid positive lock-up at a selected command location, means for mounting a lock rack segment, to the carriage with a pivotal means to engage tooth-to-tooth with a stationary precision rack for final carriage travel lock-up, means for sensing the travel location as said carriage moves by sending multiple feedback signals to a control system for operation of precision lock-up at the end of command travel, and means to generate one of multiple feedback location signals from said mating teeth surface and signal travel location of said moving carriage, means for reading the travel location of said carriage by cam operating sensor switches that control power to said motor, means for operating limit switches, corresponding to predetermined travel locations of said carriage, operationally linked to said means for reading and controlling change and travel of said carriage, means for sensing travel of said carriage with contact and operational proximity switches located along the path of carriage travel, means for supplying direct dial-in-digital-numeric-command information to said practical measurement system by remote electrical signal source or by operator push buttons and rotary switches, means for powering said lock rack into said precision rack at the end of the travel command coupled to said means for sensing a specific travel location, to relax said drive and to power said actuator, and engage at a predetermined lock-up location of said carriage, and means for directing commands for: SET, WAIT, GO, ON, OFF, and sequential commands for system operation, and for providing a control panel to input carriage travel commands to said system, and means for generating travel location information, from carriage motion and position, as a number value capable of being directly-encoded-and-decoded numerically in inches or millimeters of travel distances.

2. In the practical measurement system of claim 1, wherein said motorized, bi-directional, multi-speed, power means includes means for urging said carriage against a positive fixed or moveable stop.

3. In the practical measurement system of claim 1, wherein said means for mating tooth-to-tooth further comprises a plurality of short-length selectable lock rack segments with multiple teeth, each set of said multiple teeth providing approximately 85% broad area contact for mating with teeth on said precision rack.

4. In the practical measurement system of claim 1, wherein said means for mounting lock rack segment, comprises a spring-arm lever for said selected lock segment.

5. In the practical measurement system of claim 1, wherein said means for powering said lock rack into said precision rack at the end of the travel command coupled to said means for sensing a specific travel location, to relax said drive and to power said actuator, and engage at a predetermined lock-up location of said carriage, into teeth to teeth mating with said stationary precision rack is a solenoid, cylinder, rotary cam, link, leaf or wedge actuator.

6. In the practical measurement system of claim 1, wherein said means for sensing the travel location as said carriage moves by sending multiple feedback signals relative to the position of said carriage includes top-of-tooth sensors that signal proximity of said precision rack, the tooth surfaces by magnetic, electrical, optical, or valve sensing means using pitch location to produce said multiple feedback location signals.

* * * * *